Dec. 21, 1965   L. BLOOM   3,224,474
AUTOMATICALLY-APPLIED FRICTION BRAKING MEANS
FOR A PORTABLE ELECTRIC TOOL
Filed Dec. 17, 1964   2 Sheets-Sheet 1
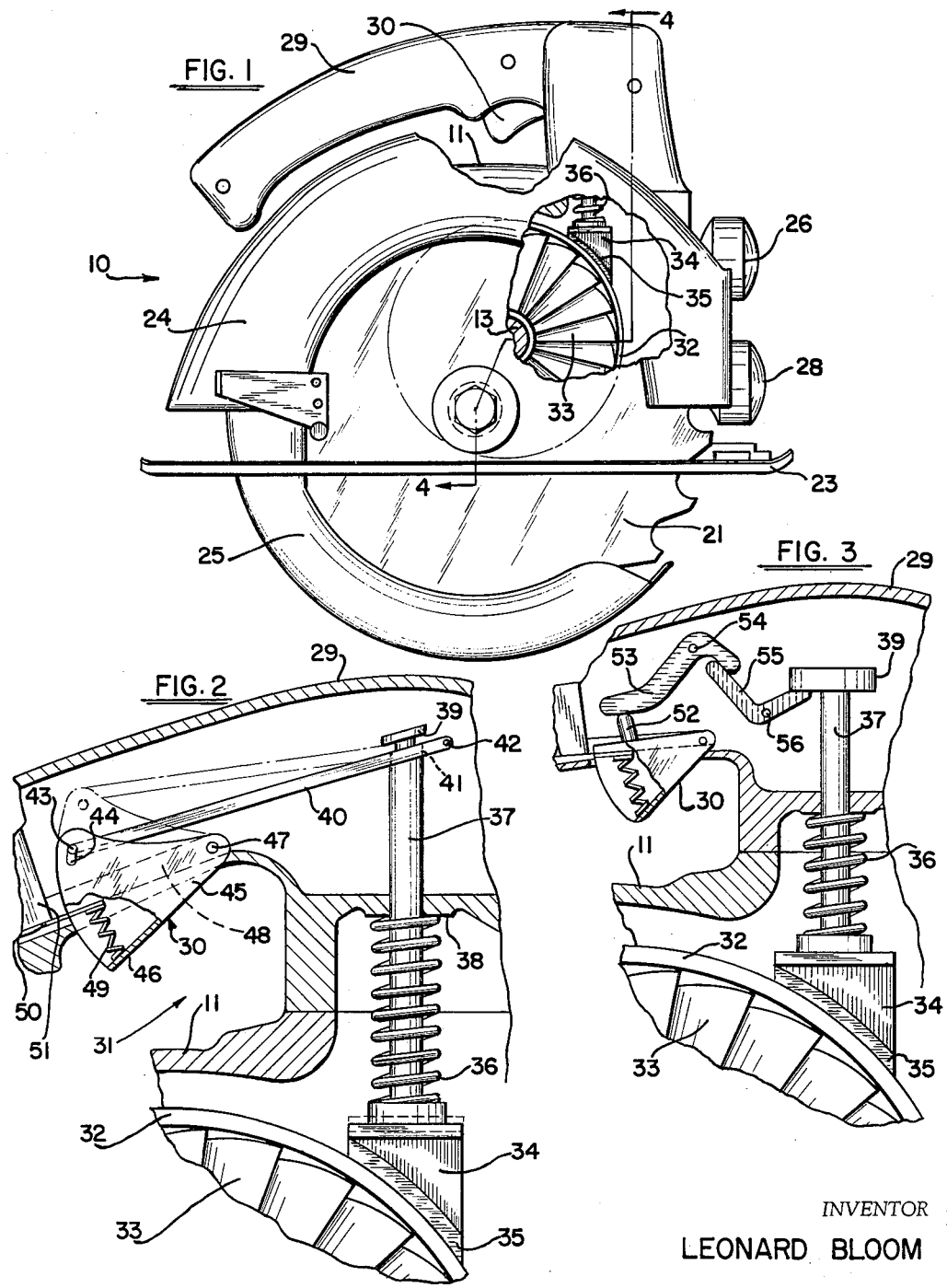
INVENTOR
LEONARD BLOOM
BY *Leonard Bloom*
ATTORNEY

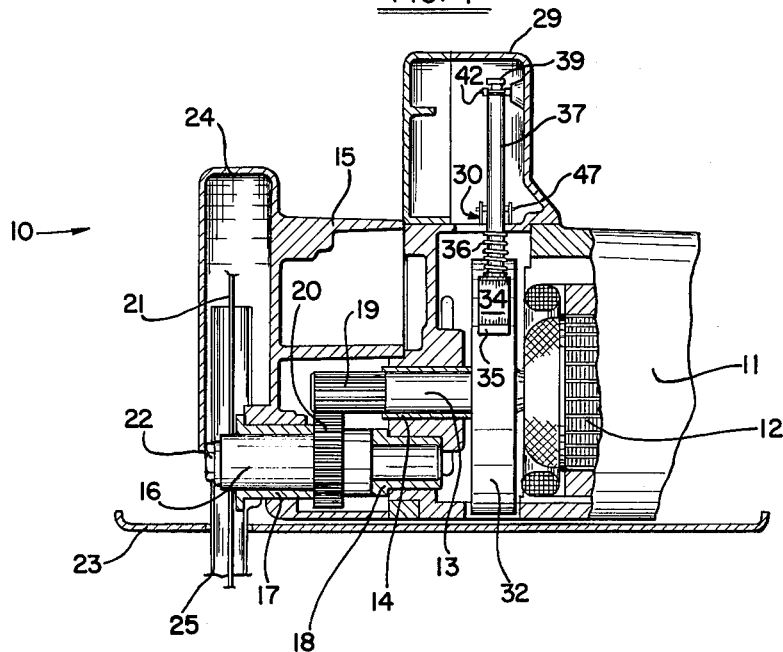

United States Patent Office 3,224,474
Patented Dec. 21, 1965

3,224,474
AUTOMATICALLY-APPLIED FRICTION BRAKING MEANS FOR A PORTABLE ELECTRIC TOOL
Leonard Bloom, Baltimore, Md., assignor to The Black and Decker Manufacturing Company, Towson, Md., a corporation of Maryland
Filed Dec. 17, 1964, Ser. No. 419,102
4 Claims. (Cl. 143—43)

This application is a continuation-in-part of my earlier application S.N. 297,154, filed July 23, 1963, and now abandoned.

The present invention relates to an automatically-applied friction-type of brake for an electrically-operated device, and more particularly, to a friction brake for a hand-operable portable electric tool, such as a portable electric rotary saw, wherein the brake is removed when the trigger switch is depressed, and wherein the brake is automatically applied upon the manual release of the trigger switch.

It is an object of the present invention to provide an automatically-applied friction-type of brake for a hand-operable portable electric tool, wherein the brake is mechanically linked to the switch and has the advantages and desirable features of safety and reliability, positive operation, ruggedness, ease of assembly, and low-cost.

It is another object of the present invention to provide a mechanical linkage means between the trigger switch and the brake shoe, wherein the linkage includes an amplifying lever having a mechanical advantage to lift the brake shoe away from the drum, thereby reducing operator pressure or fatigue to a normally acceptable level.

It is yet another object of the present invention to apply a radial braking force to a brake drum carried by the higher-speed motor shaft (as distinguished from a brake drum carried on the lower-speed saw spindle) such that the braking force is applied more efficiently and more positively, and to apply the braking force immediately upon release of the manual trigger switch, in combination with a linkage means which provides a distinct mechanical advantage so as to alleviate operator fatigue when cutting with the saw.

In accordance with the teachings of the present invention, there is herein illustrated and described, an automatically-applied friction-type of brake for a hand-operable portable electric saw. Preferably, the saw comprises a substantially-flat shoe plate for supporting the saw upon the top surface of a workpiece, a housing structure on the shoe plate, a motor in the housing provided with a shaft, a spindle journaled in the housing, gear reduction means to drive the spindle from the motor shaft, the spindle rotating at a lower speed than the motor shaft, a blade mounted on the spindle and extending through the shoe plate to engage the work, an upper handle on the housing for manually guiding the saw along the top surface of the work, and an electric switch mounted in the upper handle, the switch being provided with a manually-depressible resiliently-biased trigger for energizing the motor from the electric line.

The present invention constitutes an improvement for automatically braking the blade to a stop subsequent to disconnecting the motor from the line and comprises a brake drum mounted on the motor shaft within the housing, a brake shoe within the housing and engaging the drum to exert a radial braking force thereon, means constantly urging the brake shoe against the drum, and linkage means between the housing and the handle and connected between the brake shoe and the switch trigger, the linkage means providing a distinct mechanical advantage and counteracting the means to constantly urge the brake shoe against the drum, whereby operator fatigue in the normal use of the saw is reduced to an acceptable level, whereby when the switch trigger is manually actuated to energize the motor, the linkage means automatically withdraws the brake shoe away from the drum, and whereby when the switch trigger is manually released, the brake shoe automatically returns into braking engagement with the drum carried by the higher-speed motor shaft.

These and other objects of the present invention will become apparent from a reading of the following specification, taken in conjunction with the enclosed drawings, in which:

FIGURE 1 is a side elevation of a hand-operable portable electric saw with part of its stationary upper guard and circular blade being broken away to illustrate the motor housing, the brake drum which is rotatably driven by the motor shaft, the brake shoe that normally engages the drum, and the spring that constantly urges the shoe against the drum;

FIGURE 2 is an enlarged fragmentary portion of FIGURE 1 with part of the overhead handle being broken away and sectioned to illustrate the mechanical linkage means between the trigger switch and the brake shoe, the broken lines indicating the manner in which the brake shoe is lifted from the drum upon the inward movement of the trigger switch;

FIGURE 3 is an alternate embodiment illustrating a modification in the mechanical linkage means of FIGURE 2; and FIGURE 4 is a stepped section view taken along the lines 4—4 of FIGURE 2.

With reference to FIGURES 1 and 4, there is illustrated a hand-operable portable electric circular saw with which the teachings of the present invention may find particular utility. The saw 10 is provided with a motor housing 11, and an electric motor (denoted generally as at 12) is disposed in the housing. The motor has a shaft 13, see FIGURE 4, which is journaled forwardly in a sleeve 14 or other suitable bearing. A gear case 15 is secured to the motor housing, and a spindle 16 is journaled in spaced sleeves 17 and 18 (or other suitable bearings) in the gear case. The spindle 16 is driven from the motor shaft by speed-reduction gearing, which preferably comprises a pinion 19 on the motor shaft and a cooperating gear 20 on the spindle. A circular saw blade 21 (or similar tool element) is mounted on the spindle 16 by means of a nut 22 or the like, and the blade extends through a flat shoe plate 23 to engage the work, the shoe plate being adjustably connected to the housing structure in a conventional manner. The upper guard 24 is secured to the housing, and a telescoping lower guard 25 is pivotably supported by the upper guard. An adjusting knob 26, see FIGURE 1, is used for raising or lowering the motor housing with respect to the shoe plate to vary the depth of cut, and conventional means (not shown) is provided for tilting the saw blade to facilitate the making of a bevel cut. An auxiliary knob 28 and an overhead handle 29 are provided for guiding and controlling the saw, and the handle 29 is provided with a manually-manipulatable protruding trigger 30 forming part of an electric switch for energizing the electric motor from the line.

With reference again to FIGURE 1, and with further reference to FIGURE 2, the automatically-applied friction-type of braking means of the present invention is denoted generally as at 31 and comprises a brake drum 32 which is rotatably driven (or carried) directly by the motor shaft 13. Preferably, but not necessarily, the brake drum 32 is formed integrally with the cooling fan 33 for the motor in a usual manner well known in the art. A brake shoe 34 formed with a suitable brake liner 35 is constantly urged against the drum by means of a coil spring 36 or other suitable means. The brake shoe is formed with a rod (or lever) 37, see FIGURE 2, and the spring is coiled about the rod and is disposed between the shoe and ledge 38 formed internally of the handle. The opposite end of the rod carries a stop or collar 39, and a pivoted lever 40 (preferably in the form of a strap) has a slot 41 to receive the rod and (when pivoted) to engage the collar and lift the brake shoe away from the drum. One end of the lever 40 is pivoted about a stationary pin 42 carried within the handle; the other end of the lever is pivotably coupled to the trigger by means of a pin 43 carrier by the lever and disposed in a short transverse slot 44 formed in the trigger. Preferably, the trigger is formed as a sheet-metal substantially channel-shaped piece having parallel sides 45, with a slot 44 formed in each one of the sides, and the trigger further has a base 46 and a pivot pin 47, with the pivot pin 47 serving to connect the trigger to a switch operating bar 48. Preferably, a spring 49 is mounted at one end to a bracket 50 formed as part of the switch body 51, and the other end of the spring engages the base of the trigger to constantly urge the trigger to its normal position outwardly of the handle. The details of the switch and of the switch body, only part of which is shown in FIGURE 2 are conventional; and it will be appreciated that any type of manually-manipulatable switch may be employed in conjunction with the teachings of the present invention.

In operation, the trigger 30 is manually depresesd by the operator to move the switch 51 from its "off" position to its "on" position to thereby energize the motor from the line and drive the rotary saw blade 21. When the trigger 30 is moved just slightly, the end of the slots 44 engage the pin 43 and pivot the lever 40 about the stationary pin 42, as is indicated by the broken lines in FIGURE 2. The lever 40 (adjacent to its slot 41) engages the collar 39 of the rod 37 and lifts the rod against the force of the spring 36. When the rod 37 is lifted, the brake shoe 34 and its liner 35 are lifted away from the brake drum 32, and the blade 21 is free to rotate. Upon completion of the cut, the operator merely releases the trigger 30 (in the normal manner) to shut off the motor; and as soon as the trigger 30 is released, the spring 36 automatically applies the brake shoe 34 and its liner 35 against the brake drum 32, thereby frictionally braking the drum 32, the motor shaft 13, and the saw blade 21 to a stop.

Unlike prior practices in the art relating to the friction braking of portable electric saws, the braking force of the present invention is, first, applied radially and directly to a brake drum carried on the higher-speed motor shaft, and secondly, the braking force is applied automatically upon the release of the trigger switch and does not require the subsequent manual actuation of a button separate and apart from the trigger switch.

The brake shoe 34 need only be lifted by a slight amount (in the order of 1/16 of an inch or so) away from the brake drum 32 to allow the blade to rotate, and this slight movement of the brake shoe is easily accommodated by the linkage means between the trigger and the brake shoe. Moreover, the lever 40 is connected to the rod 37 intermediate the ends of the lever 40 and in relatively close proximity to the pivot point 42, such that the lever 40 comprises an amplifiyng lever and provides a distinct mechanical advantage; hence, the operator in overcoming the spring 36 (and also the trigger spring 49) will not require any unusual pressure, nor become unduly fatigued, in his normal use of the saw. Furthermore, in some designs, it may be possible to combine the springs 36 and 49 into a single resilient means.

The purpose of the pin 43 and short transverse slots 44 in the trigger 30 is to provide some "lost motion" to compensate for the normal wear on the brake liner 35 and to maintain the brake shoe 32 tight against the drum during the life of the tool. Any other conventional means for wear compensation may be employed equally as well.

With reference to FIGURE 3, an alternate embodiment is illustrated which operates substantially the same as the embodiment of FIGURE 2, but which employs a linkage means comprising a pin 52 carried by the trigger 30 and engaging the long leg of a bell crank 53 that is pivotably mounted on a pin 54. The other leg of the bell crank 53 engages one leg of a second bell crank 55 that is pivotably mounted on a pin 56 and is oppositely disposed with respect to the first bell crank. The other leg of the second bell crank 55 engages the collar 39 to lift the rod 37 and the brake shoe 32 in the manner as previously described.

Obviously, many modifications may be made without departing from the basic spirit of the present invention; and accordingly, within the scope of the appended claims, the invention may be practiced other than has been specifically described herein.

I claim:

1. In a hand-operable portable electric saw of the type comprising a substantially-flat shoe plate for supporting the saw upon the top surface of a workpiece, a housing structure on the shoe plate, a motor in the housing provided with a shaft, a spindle journaled in the housing, gear reduction means to drive the spindle from the motor shaft, a blade mounted on the spindle and extending through the shoe plate to engage the work, an upper control handle on the housing for manually guiding the saw along the top surface of the work, and an electric switch mounted in the upper handle, the switch being provided with a manually-actuated resiliently-biased trigger for energizing the motor from the electric line: The improvement of means to automaticallly brake the blade to a stop subsequent to disconnecting the motor from the line, which comprises:

(A) a brake drum mounted on the motor shaft within the housing;

(B) a brake shoe within the housing and engaging said drum;

(C) means constantly urging said brake shoe against said drum, whereby said brake shoe tends to exert a radial braking force on said drum; and (D) linkage means including at least one pivoted lever in the upper control handle, connecting said brake shoe and the switch trigger, and counteracting said radial braking force of said last-named constantly-urging means when the operator engages the switch trigger in making a cut;

(E) said pivoted lever having a distinct mechanical advantage, thereby reducing the pressure required by operator against said constantly-urging means in the normal use of the saw in making a cut;

(F) whereby said linkage means automatically withdraws said brake shoe away from said drum and allows the motor shaft to rotate when the switch trigger is manually actuated; and (G) whereby said brake shoe automatically returns into braking engagement with said drum carried on the motor shaft when the switch trigger is manually released to disconnect the motor from the line, whereby the braking force is applied automatically to the higher-speed motor shaft rather than to the lower-speed saw spindle.

2. The improvement of claim 1, wherein said linkage means comprises:

(A) a rod connected at one end thereof to said brake shoe, said rod being disposed mutually between said housing and said handle;

(B) said pivoted lever having one end thereof connected to said trigger and the other end thereof pivoted to said handle; and (C) means connecting the other end of said rod to said lever at a point intermediate the ends of said lever and in relatively close proximity to the pivot point of said lever, thereby to provide the mechanical advantage.

3. The improvement of claim 1, wherein said linkage means comprises:
   (A) a rod connected at one end thereof to said brake shoe, said rod being disposed mutually between said housing and said handle;
   (B) said pivoted lever comprising a first pivoted bell crank in said handle and having one end thereof actuated by the movement of said trigger inwardly of said handle; and
   (C) a second pivoted bell crank in said handle, disposed oppositely with respect to said first bell crank, and having one end thereof engaging the other end of said first bell crank, and further having the other end thereof engaging said rod to lift said rod in response to the inward movement of said trigger.

4. In a portable electric tool having a housing with an electric motor and further having a handle to guide and control the tool, an automatically-applied friction braking means, which comprises, in combination:
   (A) a brake drum in the housing and driven by the motor;
   (B) a truncated brake shoe engaging said drum at an off-center location on said drum;
   (C) means constantly urging said brake shoe against said drum;
   (D) a rod disposed mutually between the housing and the handle, with one end of the rod being connected to said brake shoe;
   (E) a switch mounted in the handle, normally biased into its open position, and having a manually-manipulatable element for controlling the energization of the motor; and
   (F) a pivoted lever mounted in the handle of the tool and connected between said manually-manipulatable element of said switch and the other end of said rod;
   (G) whereby, upon the closing of said switch through said manually-manipulatable element, said pivoted lever in the tool handle retracts said brake shoe away from said drum against said constantly-urging means; and
   (H) said pivoted lever having an inherent mechanical advantage, thereby reducing the pressure required by the operator in overcoming said constantly-urging means in his normal use of the tool.

References Cited by the Examiner

UNITED STATES PATENTS

| | | |
|---|---|---|
| 1,189,603 | 7/1916 | Michener. |
| 2,151,274 | 3/1939 | Hindman. |
| 2,823,325 | 2/1958 | Stephan. |

WILLIAM W. DYER, Jr., *Primary Examiner.*

DONALD R. SCHRAN, *Examiner.*